Patented Aug. 14, 1945

2,382,037

UNITED STATES PATENT OFFICE 2,382,037

NORPOLYCYCLOPENTADIENE MONO-HYDROHALIDES

Herman A. Bruson, Philadelphia, Pa., assignor to The Resinous Products & Chemical Company, Philadelphia, Pa., a corporation of Delaware No Drawing. Application February 20, 1943, Serial No. 476,641

10 Claims. (Cl. 260—648)

This invention relates to addition-rearrangement products of hydrogen halides and polycyclopentadienes and a method for their preparation.

In accordance with the disclosure of the present application, which is a continuation-in-part of copending application Serial No. 434,219, filed March 11, 1942, polymers of cyclopentadiene containing two double bonds per molecule are reacted, in the presence of water, with hydrogen halides other than hydrogen fluoride to form unsaturated hydrogen halide addition products with a simultaneous molecular rearrangement of the original polycyclopentadiene ring system to a norpolycyclopentadiene ring system, as hereinafter described.

Typical polycyclopentadienes which can be used for the purpose of this invention are, for example, dicyclopentadiene, tricyclopentadiene, tetracyclopentadiene, pentacyclopentadiene, and homologues thereof having two double bonds per molecule. Mixtures of such polycyclopentadienes may also be used, including isomers and mixtures of isomers. These polycyclopentadienes are crystalline solids obtainable by heating cyclopentadiene at 150°–200° C. in a closed vessel. They may be represented by the general formula:

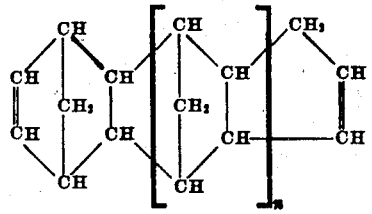

wherein n is zero or a small integer, such as 1, 2, or 3.

I have found that only one double bond of the two present in the above polycyclopentadienes reacts with hydrochloric acid, hydrobromic acid or hydriodic acid even when an excess of these acids is employed. Furthermore, I have found that the addition occurs on the double bond of the cycle having the endomethylene bridge, and that a simultaneous molecular rearrangement takes place in this ring.

For example, dicyclopentadiene reacts with the hydrogen halide (HX) as follows:

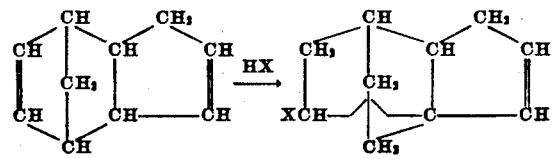

or

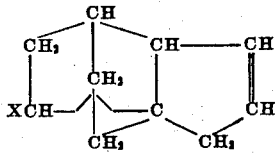

In an analogous manner, tricyclopentadiene reacts only on the double bond of the endomethylene cycle with simultaneous molecular rearrangement of the latter.

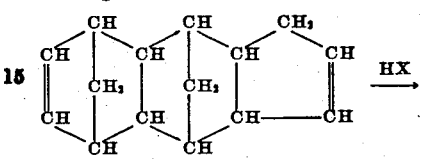

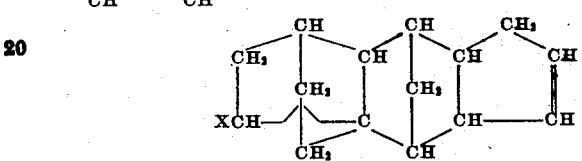

or

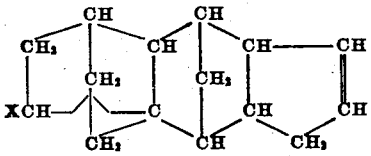

Similarly tetracyclopentadiene and pentacyclopentadiene add hydrogen halides to form addition-rearrangement products.

All of these addition-rearrangement products are new substances. In view of the fact that they are derived from polycyclopentadienes but possess a new and different ring system, they are referred to herein for the sake of brevity as "norpolycyclopentadiene" derivatives.

At room temperature the reaction occurs between polycyclopentadienes and aqueous hydrogen halides (other than hydrofluoric acid) but takes place rather slowly. Above 50° C., however, addition is rapid and complete in a reasonably short time. For practical purposes, a temperature range between 50° and 110° C. has been found most satisfactory. Anhydrous hydrogen halides (hydrochloric acid, hydrobromic acid, hydriodic acid) react to only a very slight extent, but the presence of moisture rapidly catalyzes the addition reaction and the simultaneous rearrangement of the molecule to the norpolycyclopentadiene structure.

The following examples illustrate this invention, it being understood that the quantities used can be varied from equivalent proportions to an excess of either component and that for technical purposes commercial mixtures of polycyclopentadienes can be used. Parts given are by weight.

Example 1

A mixture of 132 parts of dicyclopentadiene and 200 parts of concentrated hydrochloric acid (35%) was stirred rapidly at 60°–70° C. for five hours. The product was washed, dried and distilled under reduced pressure. The nordicyclopentadiene monohydrochloride distilled at 102°–104°/10–12 mm. as a colorless oil in a yield of 147.5 parts, or 87.5% of the theoretical yield. Upon redistillation, it boiled at 100°–102°/11 mm. and possessed the following constants: $d_4^{25}$ 1.1121; $n_D^{25}$ 1.5205.

Example 2

A mixture of 132 parts of dicyclopentadiene and 338 parts of concentrated hydrobromic acid (48%) was stirred rapidly at 65°–70° C. for three hours. The product was washed, dried, and distilled under reduced pressure. The nordicyclopentadiene monohydrobromide distilled at 90°–100°/2 mm. as a pale yellow oil in a yield of 193 parts, or 90% of theory. Upon redistillation, it boiled at 113°–114°/11 mm.

Example 3

A mixture of 66 parts of dicyclopentadiene and 270 parts of hydriodic acid (aqueous 47% solution) was stirred rapidly at 65° C. for five hours. The oil was separated, washed, dried, and distilled under reduced pressure. The nordicyclopentadiene monohydriodide distilled over at 95°–110°/1 mm. as a reddish oil in a yield of 95 parts. Upon redistillation, it boiled at 130°–132°/11 mm. and came over as a yellow oil which gradually darkened.

Example 4

A mixture of 132 parts of dicyclopentadiene and 370 parts of aqueous 20% hydrochloric acid was stirred rapidly at 60°–70° C. for five hours. The product was mixed with toluene and washed thoroughly with water followed by soda solution. The toluene solution was evaporated to a residual oil which was distilled at 11 mm. pressure. The product obtained was nordicyclopentadiene monohydrochloride, which distilled over at 96°–105° in an amount of 95 parts.

Example 5

Dry hydrogen chloride gas was passed rapidly into 132 grams of dicyclopentadiene heated to 60°–60° C. under a reflux condenser attached to a "Pyrex" glass flask in subdued light for a period of five hours. There occurred an increase in weight of only one gram.

Water (5 cc.) was then added and the passage of hydrogen chloride gas continued for five hours at the same temperature. This time, the weight increase amounted to 35 grams. The resulting dark oil was washed with water, taken up in toluene, washed again successively with dilute soda solution and water, and the toluene evaporated under reduced pressure on the steam bath. The residual oil weighed 156 grams. Upon distillation in vacuo, it yielded 130 grams of pure nordicyclopentadiene monohydrochloride.

Example 6

A mixture consisting of 100 parts of tricyclopentadiene (mixed alpha and beta isomers) and 200 parts of aqueous 35% hydrochloric acid was stirred rapidly for eight hours at 65°–70° C. An equal volume of water and toluene was added and the toluene layer separated, washed, dried, and distilled under reduced pressure. The nortricyclopentadiene monohydrochloride distilled at 144°–150°/3 mm. as a faintly yellow oil. The yield was 51 parts. Upon redistillation, it boiled at 175°/11 mm.

Example 7

Five hundred parts of dicyclopentadiene was heated in a sealed vessel at 180° C. for eight hours. A waxy solid was formed, which consisted essentially of dicyclopentadiene, tricyclopentadiene, tetracyclopentadiene, pentacyclopentadiene and higher polycyclopentadienes. This material was mixed with twice its weight of aqueous fuming hydrochloric acid and stirred rapidly at 100°–110° C. for twelve hours. The oil layer was separated, washed, dried, and filtered while hot from any insoluble matter. The clear oil obtained was a mixture of the monohydrochlorides of nor-di-, -tri-, -tetra-, and -pentacyclopentadiene. Upon distillation in vacuum, the nordicyclopentadiene and nortricyclopentadiene monohydrochlorides were removed up to a vapor temperature of 170° C./3 mm., leaving the nortetracyclopentadiene and norpentacyclopentadiene monohydrochlorides as a residual oil.

The products described above are useful as intermediates for the preparation of plasticizers, drugs, resins, and insecticides.

These products may be represented by the probable formula:

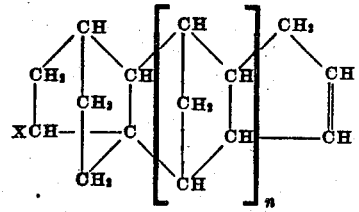

wherein X is a hologen such as chlorine, bromine, or iodine and n is a number from zero to a small whole number. It will be noted that the terminal cycle represented at the right of the formula contains an olefinic linkage which is capable of further reaction, as with chlorine, bromine, iodine, iodine chloride, thiocyanogen, hydrogen, etc.

The addition-rearrangement reaction of a crystalline polycyclopentadiene having two double bonds and one to four endomethylene cycles per molecule and a hydrogen halide having a molecular weight above twenty is generically represented as follows:

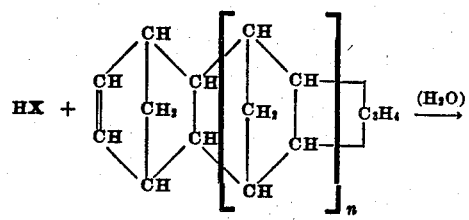

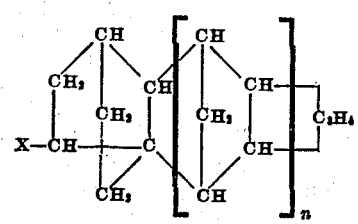

wherein $C_3H_4$ is a propenylene group which in conjunction with the adjoining carbon atoms forms a cyclopenteno group.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. An addition-rearrangement product of a hydrogen halide having a molecular weight above twenty and a crystalline polycyclopentadiene having two double bonds and one to four endomethylene cycles per molecule, said product being formed in the presence of water and being a norpolycyclopentadiene monohydrohalide having its halogen atom in one terminal cycle and having an olefinic linkage in the opposite terminal cycle.

2. An addition-rearrangement product of a hydrogen halide having a molecular weight above twenty and dicyclopentadiene, said product being formed in the presence of water and being a nordicyclopentadiene monohydrohalide having its halogen atom in one terminal cycle and having an olefinic linkage in the opposite terminal cycle.

3. An addition-rearrangement product of hydrogen chloride and dicyclopentadiene, said product being formed in the presence of water and being a nordicyclopentadiene monohydrochloride having its chlorine atom in one terminal cycle and having an olefinic linkage in the opposite terminal cycle.

4. An addition-rearrangement product of hydrogen bromide and dicyclopentadiene, said product being formed in the presence of water and being a nordicyclopentadiene monohydrobromide having its bromine atom in one terminal cycle and having an olefinic linkage in the opposite terminal cycle.

5. An addition-rearrangement product of hydrogen iodide and dicyclopentadiene, said product being formed in the presence of water and being a nordicyclopentadiene monohydroiodide having its iodine atom in one terminal cycle and having an olefinic linkage in the opposite terminal cycle.

6. A method for preparing norpolycyclopentadiene monohydrohalides having a halogen atom in one five-membered cycle and having an olefinic linkage in an opposite five-membered ring, which comprises reacting by addition and rearrangement in the presence of water and at temperatures up to about 110° C. (a) a crystalline polycyclopentadiene containing two double bonds and one to four endomethylene cycles per molecule and (b) a hydrogen halide having a molecular weight above twenty.

7. A method for preparing nordicyclopentadiene monohydrohalides having a halogen atom in one five-membered cycle and having an olefinic linkage in an opposite five-membered ring, which comprises reacting by addition and rearrangement in the presence of water and at temperatures up to about 110° C. dicyclopentadiene and a hydrogen halide having a molecular weight above twenty.

8. A method for preparing nordicyclopentadiene monohydrochloride having its chlorine atom in one five-membered cycle and having an olefinic linkage in an opposite five-membered ring, which comprises reacting by addition and rearrangement in the presence of water at temperatures up to about 110° C. dicyclopentadiene and hydrogen chloride.

9. A method for preparing nordicyclopentadiene monohydrobromide having its bromine atom in one five-membered cycle and having an olefinic linkage in an opposite five-membered ring, which comprises reacting by addition and rearrangement in the presence of water at temperatures up to about 110° C. dicyclopentadiene and hydrogen bromide.

10. A method for preparing nordicyclopentadiene monohydroiodide having its iodine atom in one five-membered cycle and having an olefinic linkage in an opposite five-membered ring, which comprises reacting by addition and rearrangement in the presence of water at temperatures up to about 110° C. dicyclopentadiene and hydrogen iodide.

HERMAN A. BRUSON.